United States Patent [19]

Nakano et al.

[11] Patent Number: 4,958,501
[45] Date of Patent: Sep. 25, 1990

[54] REFRIGERANT CHARGING APPARATUS

[75] Inventors: Genichi Nakano, Kaho; Sadao Higami, Ikeda; Yasutaka Hashimoto, Yawata, all of Japan

[73] Assignees: Matsushita Electric Industrial Co., Ltd.; Fukuhou Teisan Co., Ltd.; Denegen Co., Ltd., all of Osaka, Japan

[21] Appl. No.: 378,282

[22] Filed: Jul. 11, 1989

[30] Foreign Application Priority Data

Jul. 11, 1988 [JP] Japan .................. 63-172150

[51] Int. Cl.⁵ ............................ F25B 45/00
[52] U.S. Cl. ...................... 62/125; 62/292; 62/294; 222/5; 222/23
[58] Field of Search ............... 62/125, 127, 129, 149, 62/77, 292, 293, 294, 299; 222/4, 5, 23, 51; 141/94, 95, 96

[56] References Cited

U.S. PATENT DOCUMENTS 3,052,101  9/1962  Bishop .................... 62/125 X
3,093,979  6/1963  Ehrens et al. ............ 62/77 X
3,916,642 11/1975  Mullins .................... 62/292

Primary Examiner—Harry B. Tanner
Attorney, Agent, or Firm—Cushman, Darby & Cushman

[57] ABSTRACT

In a refrigerant charging apparatus for changing a refrigerant by using a refrigerant can (1), an upper can-opening part (21), a conduit (6) having two ways of inner passages for indication and charging and a lower can-opening part (6A), and a level indicator (4) communicated with the refrigerant can via both can-opening parts are provided in order to correctly indicate remaining quantity of the refrigerant in the can.

8 Claims, 3 Drawing Sheets

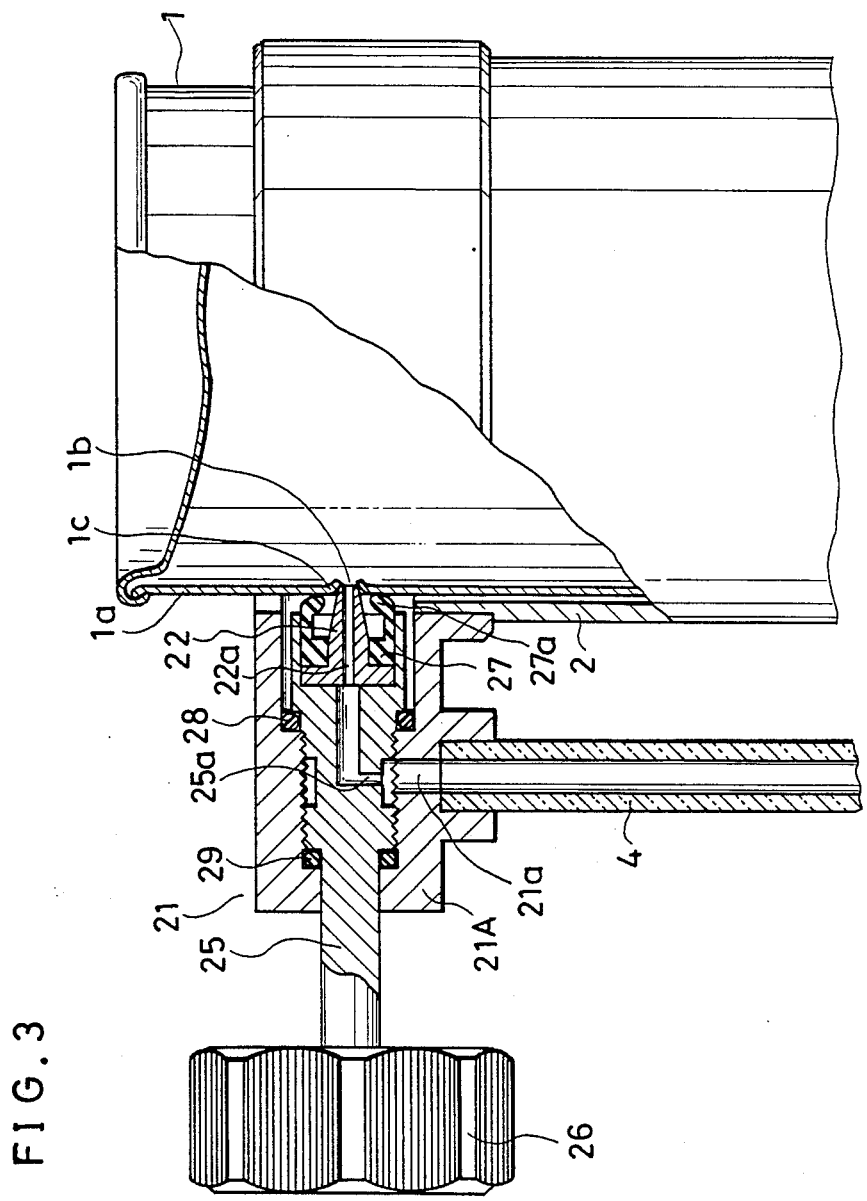

4,958,501

REFRIGERANT CHARGING APPARATUS

FIELD OF THE INVENTION AND RELATED ART STATEMENT

1. Field of The Invention

The present invention relates to a refrigerant charging apparatus which is for charging an air conditioning apparatus etc. with refrigerant in a refrigerant can.

2. Description of The Related Art

Heretofore, in order to charge the air conditioning apparatus with the refrigerant, the refrigerant is first transferred from a gas cylinder to a charging cylinder, and subsequently the refrigerant is filled from the charging cylinder to the air conditioning apparatus. Since the gas cylinder and the charging cylinder are both large in size, it is inconvenient to carry them. Therefore, a portable refrigerant can has been recently used to replace such large sized cylinders.

However, there have been unsolved problems to handle the portable refrigerant can. For instance, refrigerant of excessive quantity or insufficient quantity may be transferred to the apparatus from the refrigerant can because the quantity of the charged refrigerant can not be seen. Recently, there are many air conditioning apparatuses in which rotation speed of a compressor and opening of an expansion valve are automatically controlled in response to an applied burden. In these apparatuses, when the quantity of the charged refrigerant is inadequate, function of the air conditioning apparatus is lowered and malfunction of the apparatus may occur.

OBJECT AND SUMMARY OF THE INVENTION

The object of the present invention is to offer a refrigerant charging apparatus using the refrigerant can wherein charging quantity of the refrigerant can be observed easily and accurately.

In order to achieve the above-mentioned object, the refrigerant charging apparatus in accordance with the present invention comprises:

a frame part for holding a refrigerant can including a refrigerant therein;

a conduit which includes a first can-opening part and has at least two ways of inner passages therethrough, the first can-opening part including a first can-opener for opening one end part of said refrigerant can and making communication between the refrigerant can and the inner passages;

a second can-opening part which has an inner passage therethrough and includes a second can-opener for opening the other end part of the refrigerant can and making communication between the refrigerant can and the inner passage; and a level indicator, one end of which is communicated with one of the inner passages of the conduit and the other end of which is communicated with the inner passage of the second can-opening part, for indicating a level of the refrigerant.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 3 is an internal cross-sectional view showing an upper part of the refrigerant charging apparatus shown in FIG. 1.

It will be recognized that some or all of the Figures are schematic representations for purposes of illustration and do not necessarily depict the actual relative sizes or locations of the elements shown.

DESCRIPTION OF THE PREFERRED EMBODIMENT

Hereafter, preferred embodiment of the present invention is described with reference to the accompanying drawings.

Figure 1:
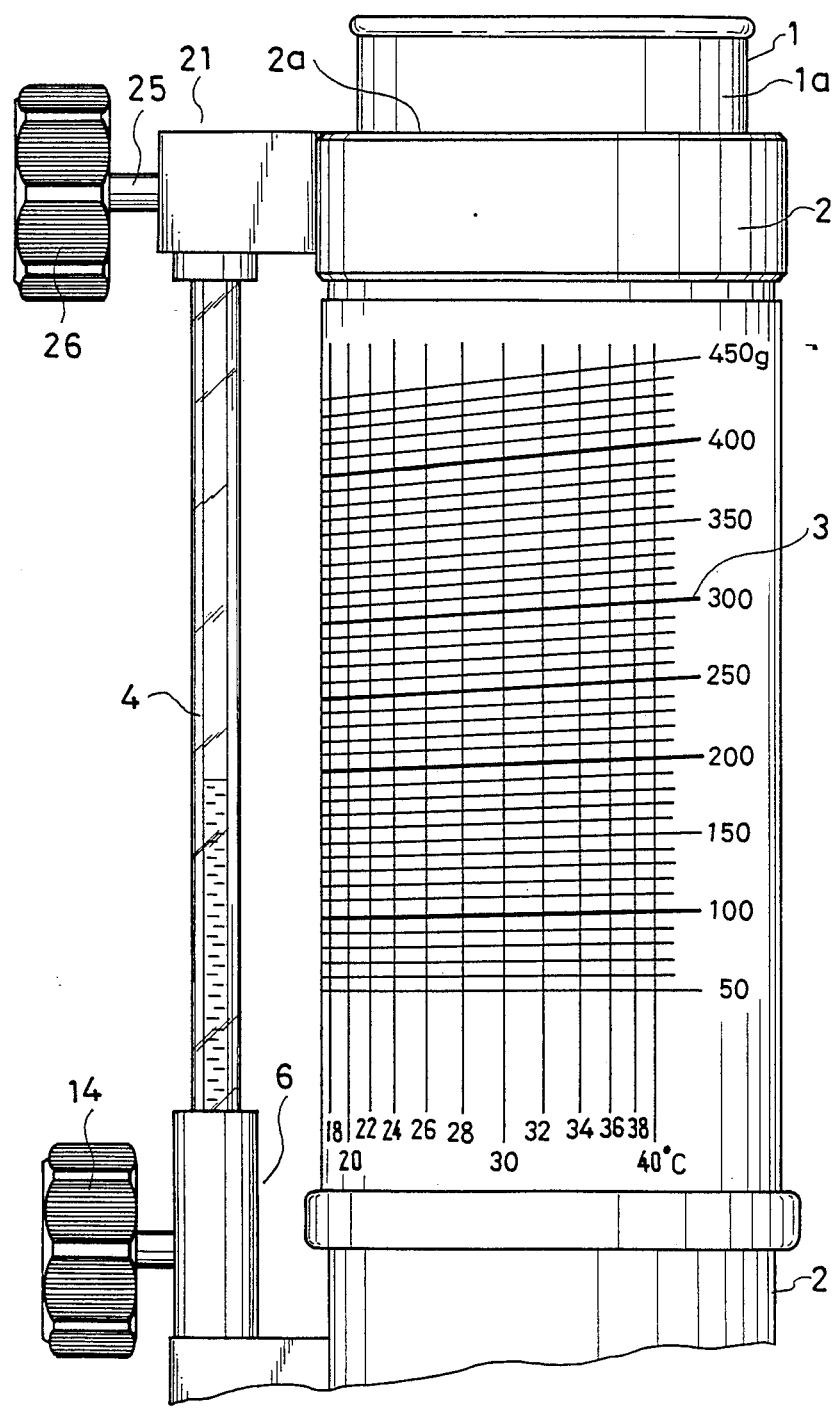
FIG. 1 is a side view showing a refrigerant charging apparatus of the present invention.

FIG. 1 is a side view showing a refrigerant charging apparatus using a refrigerant can. A frame part 2 is of cylindrical shape and has an opening 2a at the upper end thereof. A cylindrical refrigerant can 1 is inserted in the frame part 2 through the opening 2a. In the figure, only a circumferential wall 1a of bottom part of the upside-down mounted refrigerant can 1 can be seen. On a circumferential surface of the frame part 2, a graduation plate 3 is rotatably provided in order to show compensated quantity of the refrigerant against temperature change. A level indicator 4, which is made of glass tube, is vertically provided outside the frame part 2.

Figure 2:
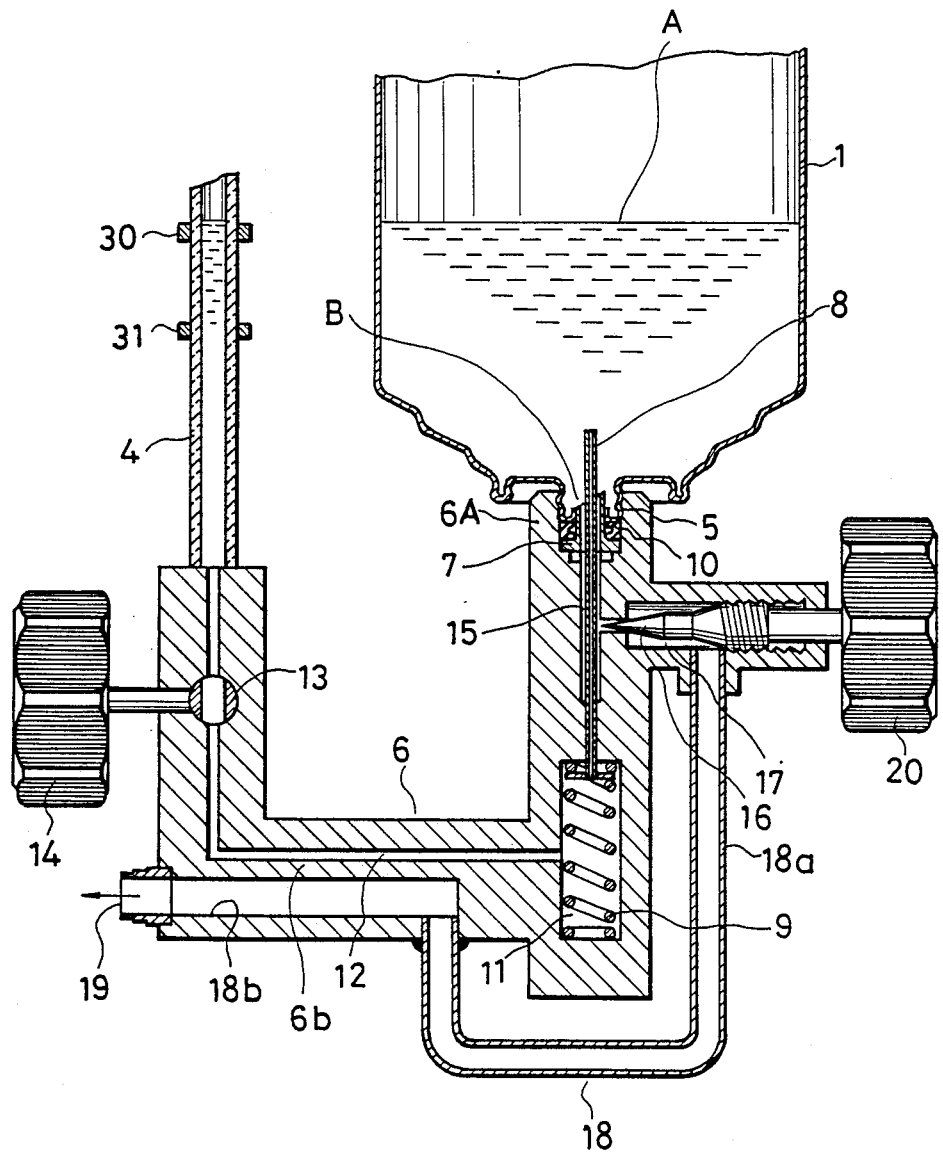
FIG. 2 is an internal cross-sectional view showing a lower part of the refrigerant charging apparatus shown in FIG. 1.

FIG. 2 is an internal cross-sectional view showing a lower part of the refrigerant charging apparatus shown in FIG. 1. The refrigerant can 1 has a sealed mouth 5, and an outer circumference of the sealed mouth 5 forms a screw thread. An inner circumferential surface of a first can-opening part 6A, which is a part of a conduit 6, forms a screw thread to be engaged with the screw thread of the sealed mouth 5. A can-opener 7 is shaped in a pipe-shape with a sharp edge provided vertically upward in the first can-opening part 6A. A tube 8 is slidably provided through the can opener 7 in the vertical direction. The tube 8 is urged by an elastic element (e.g. spring) 9 to move upward. In the first can-opening part 6A, a packing 10 is provided to avoid leakage of the refrigerant at the time when the sealed mouth 5 is opened. A lower end of the tube 8 is opened in a space 11 which is formed in the conduit 6 and holds the elastic element 9. This space 11 is communicated with the level indicator 4 through a refrigerant passage 12 formed in the conduit 6. On the path of the refrigerant passage 12, a valve 13 is provided. The valve 13 is closed/opened by turning a knob 14 clockwise/anticlockwise.

The refrigerant A flows into a refrigerant passage 15 formed in the conduit 6 through a gap B between the can-opener 7 and the tube 8. When an expansion valve 16 is open, the refrigerant in the refrigerant passage 15 flows into a space 17 including the expansion valve 16 and is led to an outlet 19 through a bypassing passage 18. The bypassing passage 18 is constituted by an external tube 18a and an inner passage 18b formed in the conduit 6. The expansion valve 16 is closed/opened by turning a knob 20 clockwise/anticlockwise, thereby to control outflowing quantity of the refrigerant from the outlet 19. The inner passage 18b is formed beside a part of the refrigerant passage 12 in a manner that a comparatively thin wall 6b is left therebetween. Owing to this construction, the conduit 6 is refrigerated by vaporization of the refrigerant flowing in the passage 18b, and bubbles in the refrigerant, which flows in the passage 12, are thereby liquefied. Therefore, vibration of level of the refrigerant in the level indicator 4, caused by the bubbles in the refrigerant is prevented.

FIG. 3 is an internal cross-sectional view showing an upper part of the refrigerant charging apparatus shown in FIG. 1. A second can-opening part 21 is provided on an upper periphery of the frame part 2. The second can-opening part 21 comprises a housing 21A, a can opener 22, a packing 27 and a shaft 25 with a knob 26. The can opener 22 is shaped like a pipe cut with a plane oblique to the axis thereof, thereby having a sharp edge directed to the axial centerline of the frame part 2. The packing 27 is made of elastic material and disposed to encircle the can opener 22. The can opener 22 and the packing 27 are held in an end part of the shaft 25, and a refrigerant passage 22a formed in the can opener 22 is communicated with a refrigerant passage 25a formed in the shaft 25. Further, the refrigerant passage 25a is communicated with the level indicator 4 through a refrigerant passage 21a formed in the housing 21A. The shaft 25 is screwed/unscrewed by turning the knob 26 clockwise/anticlockwise. Sealing members 28 and 29 are provided between an inner surface of the housing 21A and an outer surface of the shaft 25 in order to prevent leakage of the refrigerant therefrom.

Next, operation of the above-mentioned refrigerant charging apparatus is described.

The refrigerant can 1 (FIG. 2) is inserted in the frame part 2 through the opening 2a with its sealed mouth 5 downward. After making contact of the sealed mouth 5 with the first can-opening part 6A, the refrigerant can is rotated with downward pressure applied, thereby screwing the sealed mouth 5 into the first can opening part 6A. At that time, the tube 8 is pushed down by the sealed mouth 5 until the sealed mouth 5 is opened by the can-opener 7. When the sealed mouth 5 is opened, the tube 8 is vertically pushed up by the force of the elastic element 9. Mounting of the refrigerant can 1 in the frame part 2 is thus completed.

After that, by turning the knob 26 (FIG. 3) clockwise, the shaft 25 and the can opener 22 advance to push the refrigerant can 1, and finally a small hole 1b is bored in the wall 1a of the refrigerant can 1. An edge 1c around the hole 1b is dented by receiving pushing force of the can opener 22. The packing 27 is also pushed toward the refrigerant can, and an end 27a of the packing 27 encircles the hole 1b and the dented edge 1c, thereby sealing a periphery of the hole 1b. Leakage of the refrigerant from around the hole 1b is thus prevented.

In the above-mentioned state, when the knob 14 (FIG. 2) is rotated to thereby open the valve 13, the refrigerant in the refrigerant can 1 rushes into the level indicator 4 through the tube 8, the space 11 and the refrigerant passage 12. Since an upper end of the level indicator 4 is communicated with the refrigerant can 1 through the second can-opening part 21, level of the refrigerant, which rises in the level indicator 4, becomes equal to the level of the refrigerant A in the refrigerant can 1. Therefore, quantity of the refrigerant A in the refrigerant can 1 is decided by comparing the level with the graduations on the graduation plate 3. Since volume of the refrigerant is considerably changed in response to change of ambient temperature, the level of the refrigerant rises or lowers accordingly from the true level at a reference temperature. By turning the graduation plate 3 in response to the ambient temperature, temperature-compensated volume of the refrigerant can be read.

Next, charging operation of the refrigerant in the refrigerant can 1 into the air conditioning apparatus etc. is described. First, the outlet 19 is connected with the air conditioning apparatus directly or via a hose (not shown) etc. Second, the knob 20 is turned to open the expansion valve 16, thereby allowing communication between the refrigerant passage 15 and the bypassing passage 18. Then, the refrigerant in the can 1 rushes in the gap B between the pipe 8 and the can opener 7. Since an upper end of the tube 8 is projected higher than the can opener 7, vibration of the refrigerant, which is caused by the rush into the gap B, is not transmitted to the refrigerant in the level indicator 4. Therefore, the level of the refrigerant does not vibrate. In response to the charged quantity of the refrigerant, liquefied refrigerant in the refrigerant can 1 decreases, and the level of the refrigerant A gradually lowers. Also, the level of the refrigerant in the indication part 4 lowers to be equal with the level in the refrigerant can 1. When the level of the refrigerant is changed, a part of the refrigerant moves through the refrigerant passage 12. If a peripheral part of the passage 12, which include the wall 6b, is not cold in comparison with temperature of the refrigerant, there is a fear to cause an undesirable state such that the refrigerant in the passage 12 vaporizes by taking heat from the peripheral part of the passage 12. In such case bubbles of the refrigerant rise in the level indicator 4. However, since the inner passage 18b is disposed close to the passage 12, the peripheral part of the passage 12 is refrigerated mainly through the wall 6b. As a result, vaporization of the refrigerant is prevented, and the vaporized refrigerant is liquefied again. Thus, rising of bubbles in the level indicator 4 does not occur, nor does the level of the refrigerant vibrate.

In the above-mentioned embodiment, partially different constructions can be employed in place of the above-mentioned construction. For instance, the first can-opener 7 may be provided horizontally in a manner that the edge thereof opens the sealed mouth 5 from the side of threw thread or horizontally opens another circumferential surface of the refrigerant can 1. The second can-opener 22 may be provided vertically in a manner that the edge thereof opens the bottom part of the refrigerant can 1 by pushing downward. Further, a thermometer may be provided beside the level indicator 4 in order to utilize the graduation plate 3 conveniently. Besides, as shown in FIG. 2, level rings 30 and 31, which are vertically slidable on the level indicator 4, may be provided in order to easily check the level of the refrigerant.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A refrigerant charging apparatus comprising:
   a frame part for holding a refrigerant can including a refrigerant therein;
   a conduit which includes a first can-opening part and has at least first and second inner passages therethrough, said first can-opening part including a first can-opener for opening one end of said refrigerant can and making communication between said refrigerant can and said inner passages;

a second can-opening part which has an inner passage therethrough and includes a second can-opener for opening the other end of said refrigerant can and making communication between said refrigerant can and said inner passage; and a level indicator, one end of which is communicated with one of said inner passages of the conduit and the other end of which is communicated with said inner passage of the second can-opening part, for indicating a level of said refrigerant, wherein the first inner passage leads said refrigerant to an outlet from the conduit, and the second inner passage leads said refrigerant to said indicator, wherein said first inner passage has an expansion part for expanding said refrigerant, said expansion part being disposed away from said second inner passage, while after the expansion part the first inner passage is disposed near said second inner passage.

2. A refrigerant charging apparatus in accordance with claim 1, wherein said first can-opening part is disposed at a position corresponding to a sealed mouth of said refrigerant can, and said second can-opening part is disposed at a position corresponding to a circumferential wall of said refrigerant can, and said level indicator is disposed in parallel with an axial direction of said refrigerant can and comprises a glass tube to pass refrigerant.

3. A refrigerant charging apparatus comprising:

a cylindrical frame for holding a refrigerant can including a refrigerant therein, said frame having an opening for inserting said refrigerant can into a top part thereof;

a conduit which includes a first can-opening part disposed at a lower mid part of said frame for holding a sealed mouth of said refrigerant can and has at least first and second inner passages therethrough, said first can-opening part including a first can-opening for opening said sealed mouth and making communication between said refrigerant can and said inner passages;

a second can-opening part which is disposed at an upper circumferential part of said frame and has an inner passage therethrough, said second can-opening part including a second can-opener for opening a circumferential wall of a bottom part of said refrigerant can and making communication between said refrigerant can and said inner passage of the second canopening part; and a level indicator, one end of which is communicated with one of said inner passages of the conduit and the other end of which is communicated with said inner passage of the second can-opening part, for indicating a level of said refrigerant, said level indicator being disposed in parallel with an axial direction of said frame part; wherein said second can-opener is pipe-shaped with a sharp edge thereof directed toward an axial centerline of said frame, and said second can-opening part includes:

a shaft which has an inner passage therethrough and is abutted against said second can-opener to communicate with each other;

a knob which is provided at an end of said shaft for making sliding motion of said shaft; and a packing of elastic material for encircling said second can-opener, wherein the first inner passage leads said refrigerant to an outlet from the conduit, and the second inner passage leads said refrigerant to said indicator, wherein said first inner passage has an expansion part for expanding said refrigerant, said expansion part being disposed away from said second inner passage, while after the expansion part the first inner passage is disposed close to said second inner passage.

4. A refrigerant charging apparatus comprising:

a cylindrical frame for holding a refrigerant can including a refrigerant therein, said frame having an opening for inserting said refrigerant can in a top part thereof;

a conduit which includes a first can-opening part disposed at a lower mid part of said frame for holding a sealed mouth of said refrigerant can and has at least two ways of inner passages therethrough, said first can-opening part including a first can-opener for opening said sealed mouth and making communication between said refrigerant can and said inner passages;

a second can-opening part which is disposed at an upper circumferential part of said frame and has an inner passage therethrough, said second can-opening part including a second can-opener for opening a circumferential wall of a bottom part of said refrigerant can and making communication between said refrigerant can and said inner passage of the second can-opening part; and a level indicator, one end of which is communicated with one of said inner passages of the conduit and the other end of which is communicated with said inner passage of the second can-opening part, for indicating a level of said refrigerant, said level indicator being disposed in parallel with an axial direction of said frame part; wherein said first can-opener is pipe-shaped with a sharp edge thereof directed vertically upward, and said first can-opening part includes:

a tube which is slidably provided through said first can-opener in the vertical direction and communicated with said one of the inner passages of said conduit, wherein a gap space between said first can-opener and said tube is communicated with the other one of said inner passages of the conduit.

5. A refrigerant charging apparatus in accordance with claim 4, further comprising an elastic element for urging said tube vertically upward.

6. A refrigerant charging apparatus in accordance with claim 4 or 5, wherein one of said inner passages of the conduit leads said refrigerant to an outlet, and the other one of said inner passages of the conduit leads said refrigerant to said indicator, said inner passages of the conduit being disposed at least partially close to each other.

7. A refrigerant charging apparatus in accordance with claim 4, further comprising a graduation plate for indicating change of quantity of said refrigerant in response to change of temperature.

8. A refrigerant charging apparatus comprising:

a cylindrical frame for holding a refrigerant can including a refrigerant therein, said frame having an opening for inserting said refrigerant can into a top part thereof;
a conduit which includes a first can-opening part disposed at a lower mid part of said frame for holding a sealed mouth of said refrigerant can and has at least first and second inner passages therethrough, said first can-opening part including a first can-opening for opening said sealed mouth and making communication between said refrigerant can and said inner passages;
a second can-opening part which is disposed at an upper circumferential part of said frame and has an inner passage therethrough, said can-opening part including a second can-opener for opening a circumferential wall of a bottom part of said refrigerant can and making communication between said refrigerant can and said inner passage of the second can-opening part;
a level indicator, one end of which is communicated with one of said inner passages of the conduit and the other end of which is communicated with said inner passage of the second can-opening part, for indicating a level of said refrigerant, said level indicator being disposed in parallel with an axial direction of said frame; and
a graduation plate for indicating change of quantity of said refrigerant in response to change of temperature; wherein
said second can-opener is pipe-shaped with a sharp edge thereof directed toward an axial centerline of said frame, and said second can-opening part includes:
a shaft which has an inner passage therethrough and is abutted against said second can-opener to communicate with each other;
a knob which is provided at an end of said shaft for making sliding motion of said shaft; and
a packing of elastic material for encircling said second can-opener.

* * * * *

UNITED STATES PATENT AND TRADEMARK OFFICE
CERTIFICATE OF CORRECTION

PATENT NO. : 4,958,501

DATED : September 25, 1990

INVENTOR(S) : Genichi NAKANO, et al.

It is certified that error appears in the above-identified patent and that said Letters Patent is hereby corrected as shown below:

Title page:
[73] Assignees: Matsushita Electric Industrial Co., Ltd.; Fukuhou Teisan Co., Ltd.; Dengen Co., Ltd., all of Osaka, Japan Signed and Sealed this Second Day of June, 1992

*Attest:*

DOUGLAS B. COMER

*Attesting Officer*     Acting Commissioner of Patents and Trademarks